INVENTOR.
HUGH L. PERAZONE

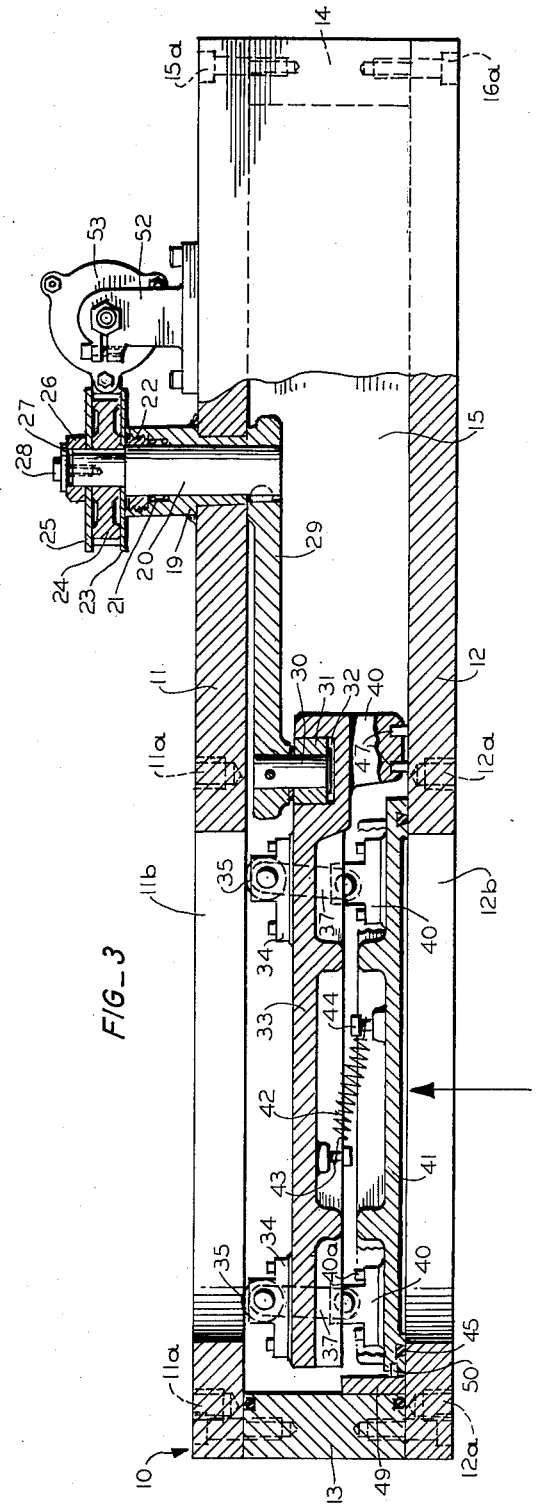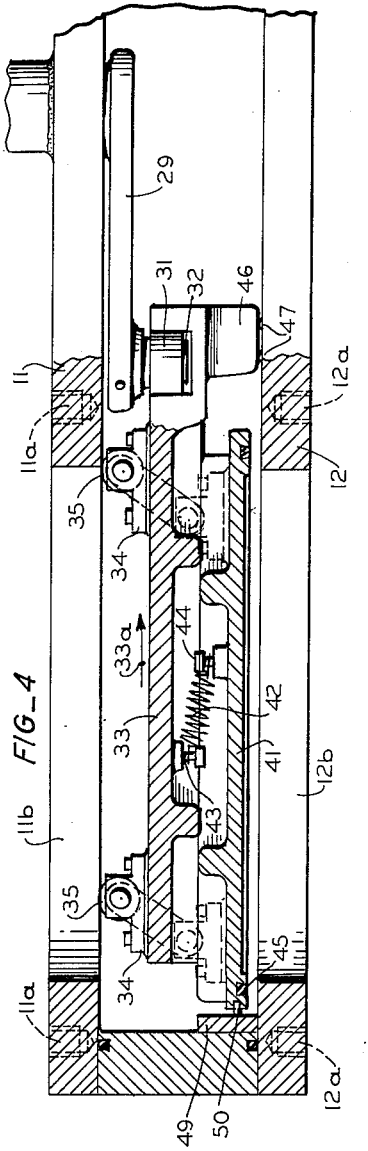

Nov. 9, 1965 H. L. PERAZONE 3,216,694
LARGE HIGH VACUUM VALVE
Filed March 14, 1962 4 Sheets-Sheet 4
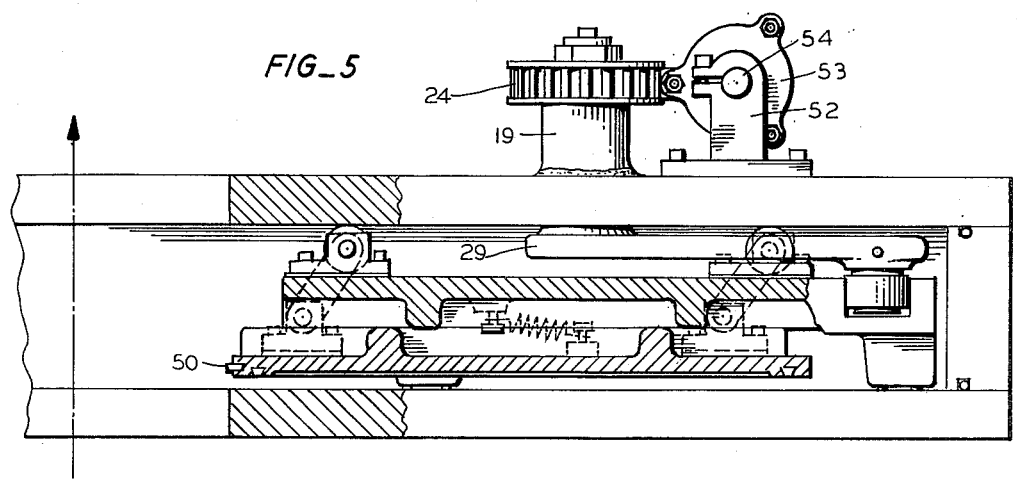
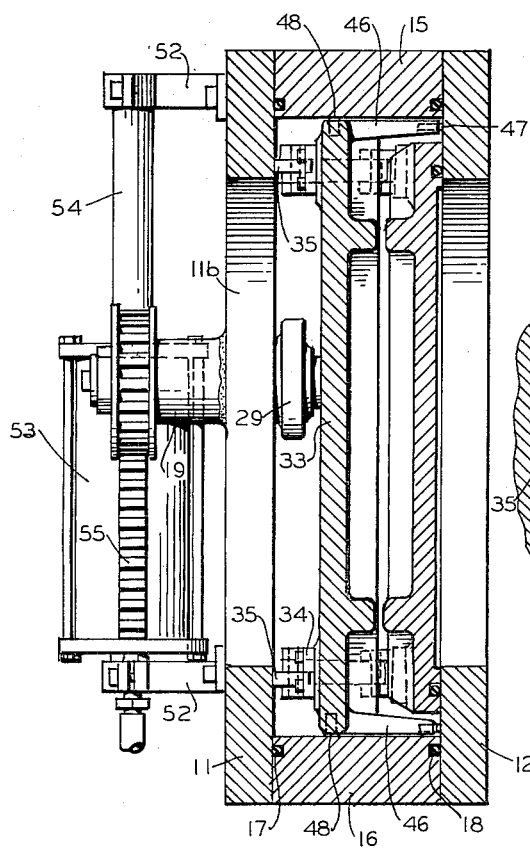
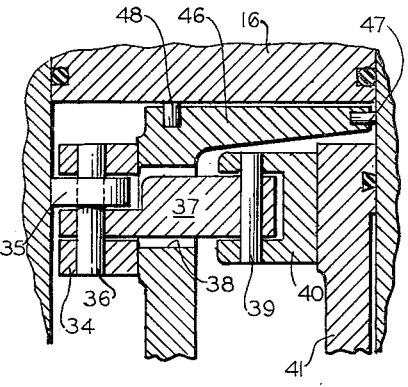
INVENTOR.
HUGH L. PERAZONE
BY
ATTORNEYS

United States Patent Office 3,216,694
Patented Nov. 9, 1965

3,216,694
LARGE HIGH VACUUM VALVE
Hugh L. Perazone, San Leandro, Calif., assignor to Cenco Instruments Corporation, Chicago, Ill.
Filed Mar. 14, 1962, Ser. No. 179,689
4 Claims. (Cl. 251—158)

This invention relates to gate valves in general. More particularly, this invention relates to gate valves adapted to close relatively large passages in vacuum systems.

An object of this invention is to provide an improved gate valve adapted for use in closing large passageways in vacuum systems.

Another object of this invention is to provide an improved gate valve for use in closing large passageways in vacuum systems relatively easily and efficiently.

Still a further object of this invention is to provide an improved gate valve for use in closing relatively large passageways, said gate valve being provided with a movable plate for moving a valve disc across the passage that is to be closed and causing the valve disc to engage one side of the valve chamber, said movable plate being provided with a plurality of rollers which are mounted thereon by fittings which also serve for pivotally connecting the valve disc links thereto, said rollers being adapted to engage the other side of the valve chamber to hold the valve disc in closed position.

Other and further objects of this invention will be apparent to those skilled in the art to which it relates from the following specification, claims and drawings:

In accordance with this invention, there is provided an improved gate valve that is adapted for use in closing relatively large passages in high vacuum systems. Valves of this type have been constructed in accordance with this invention with the valve discs having diameters on the order of 16 inches. Valve discs of these diameters may be subjected to loads on the order of 5200 pounds when used in a vacuum system, and this gate valve was constructed so that it is capable of withstanding such loads.

Further details and features of this invention are set forth and described in connection with a preferred embodiment of the invention as shown in the accompanying drawings in which, briefly:

FIG. 3 is a sectional view taken along the line 3—3 of FIG. 1;

FIG. 4 is a vertical sectional view similar to FIG. 3 showing the valve in partially opened position;

FIG. 5 is a vertical sectional view also similar to FIG. 3 showing the valve in completely opened position;

FIG. 6 is a sectional view taken along the line 6—6 of FIG. 1; and

FIG. 7 is an enlarged sectional view taken along the line 7—7 of FIG. 2.

Figure 1:
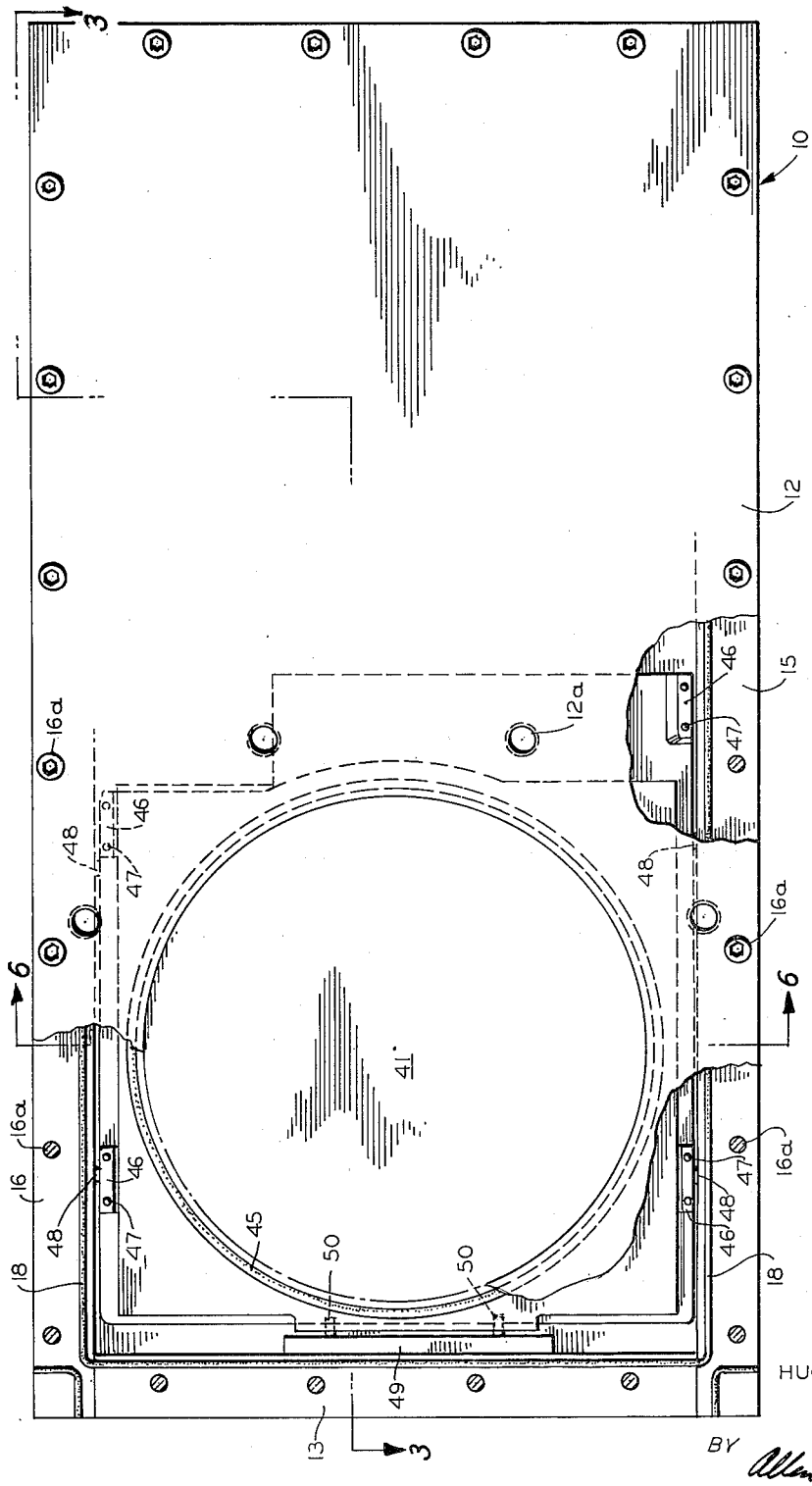
FIG. 1 is a view partially in section in front elevation of an embodiment of this invention.

Referring to the drawing in detail, reference numeral 10 designates the housing of this valve mechanism which comprises the top plate member 11, bottom plate member 12, end walls 13 and 14 and side walls 15 and 16. The top plate member 11 is attached to the end and side walls by means of suitable screws or bolts 15a, the heads of which are countersunk into the plate 11 and these heads are also provided with suitable wrench receiving sockets. The bottom plate 12 is attached to the end and side walls in a similar manner by means of screws or bolts 16a which are also countersunk and the heads of which are also provided with wrench receiving sockets.

These plates 11 and 12 are provided with relatively large holes or openings 11b and 12b, respectively, and these openings are surrounded by a plurality of spaced threaded holes 11a and 12a, respectively, for the purpose of attaching connecting flanges of suitable pipes (not shown) which are attached to this valve mechanism housing when it is connected to the vacuum system or other system in which the valve is to be employed. Ordinarily, the vacuum side of the system is connected to the plate 11 and the atmosphere side is connected to the plate 12 although this may be reversed if desired.

Suitable gaskets 17 and 18 are provided in grooves formed in the end walls 13 and 14 and side walls 15 and 16 so that these gaskets are positioned between these walls and the plates 11 and 12, respectively. Thus when these plates are clamped to the walls by means of the bolts 15a and 16a, respectively, these gaskets function to provide an efficient seal therebetween.

A small hole is provided in the plate 11 for receiving the sleeve 19 which is positioned therein and which is welded or otherwise fixedly attached to this plate. This sleeve extends outward from the plate 11 and functions as a bearing for the short shaft 20. A pair of O-rings 21 function as a seal around the shaft 20 and these O-rings are positioned in an internal groove formed in the sleeve 19. A suitable pumpout tube (not shown) may be provided to a hole in the sleeve 19 connecting to the gasket groove so that if these gaskets fail pumping apparatus may be connected to this tube. A ring-shaped member 22 is threaded into the outer end of the sleeve 19 and this ring-shaped member may be removed to provide access to the O-rings 21.

The outer end portion of the shaft 20 is provided with a shoulder against which the washer 23 is lodged. The gear wheel or sprocket 24 which is of somewhat less diameter than the washer 23 is positioned over this washer and is keyed to the shaft 20 so as to be fixedly attached thereto. Another washer 25 which is of the same diameter as washer 23 is positioned over sprocket 24. The nut 26 is threaded to the end of the shaft 20 and is positioned over the washer 25, to hold the sprocket and washers assembled on the shaft. Another washer 27 is placed over the nut 26 and the bolt 28 which is threaded into the end of the shaft 20 is provided for locking the aforesaid nut in place.

The arm 29 is positioned inside of the valve chamber 10 and one end portion of this arm is fixedly attached to the inner end of the short shaft 20 so that this arm is rotatable by means of the shaft 20. A pin 30 is fixedly attached to the other end portion of the arm 29 and this pin is provided with a roller 31 which is positioned in the slot 32 of the movable plate 33. The movable plate 33 is provided with four fittings 34 which are attached to the corner areas thereof by means of the bolts 34a. Each of these fittings is provided with a short shaft 36 extending therethrough for the purpose of rotatably supporting the rollers 35 provided to the fittings. One end of each of the links 37 is also pivotally supported on the shafts 36 of the respective fittings 34.

The other ends of these links 37 are pivotally attached to the shafts 39 provided to the fittings 40 which are attached to corner portions of the valve disc 41 by means of the screws or bolts 40a. Four links 37 are provided and thus all four corner portions of the valve disc 41 are pivotally attached to the movable plate 33 by these links 37. A spring 42 is provided between the movable plate 33 and the valve disc 41 and one end of this spring is attached to the stud 43 projecting from one side of the movable plate 33 and the other end of the spring is attached to the stud 44 attached to the opposite side of the valve disc 41 so that this spring is between the movable plate 33 and the valve disc 41 and functions to raise the valve disc 41 toward the movable plate 33 when the valve is to be opened, that is, when the valve disc 41 and movable plate 33 are to be shifted out of the way of the valve openings 11b and 12b in the direction indicated by the arrow 33a.

Figure 2:
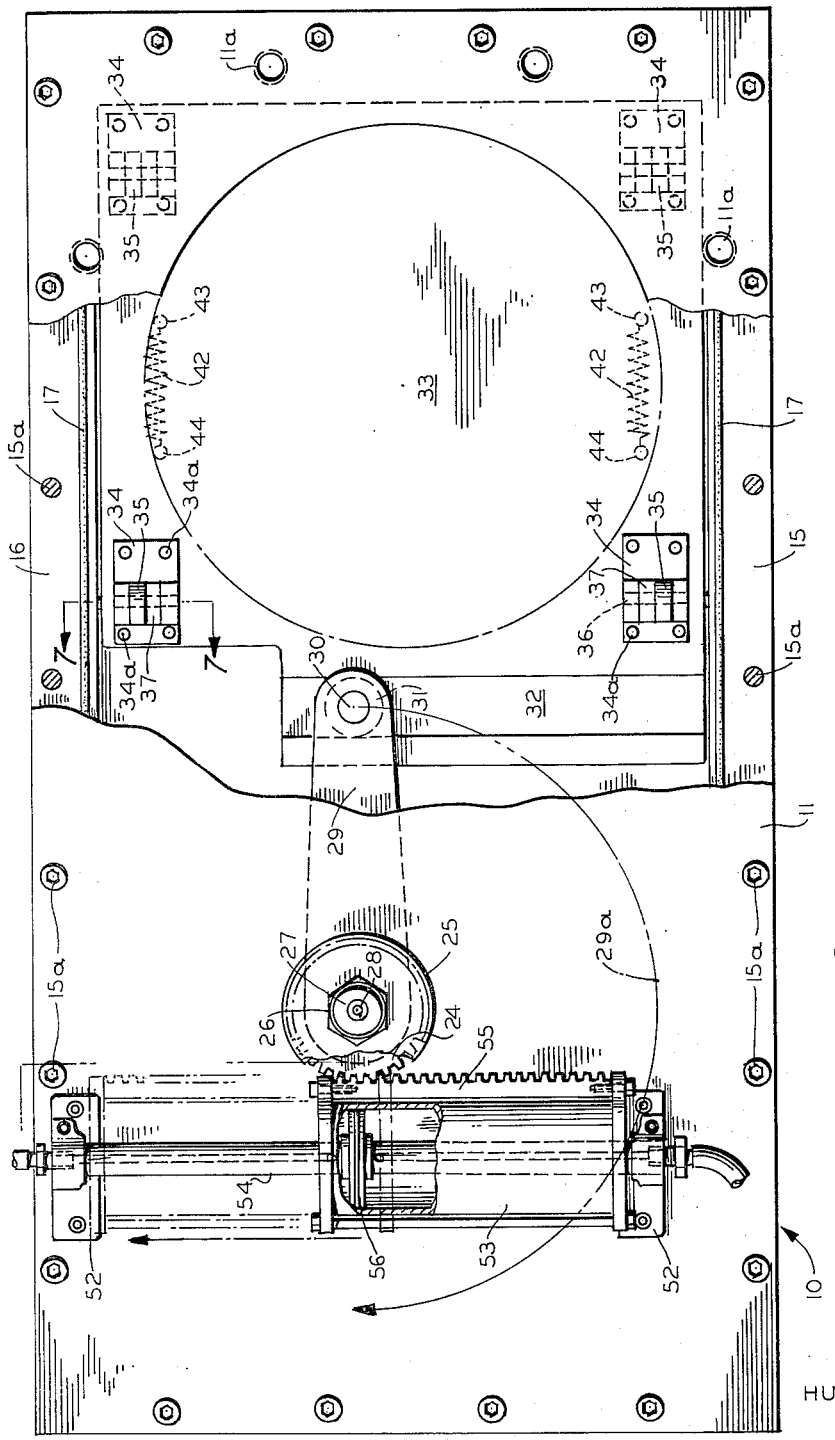
FIG. 2 is a rear elevational view partially in section.

This movement is accomplished by rotating the arm 29 in the direction indicated by the broken line 29a in FIG. 2 so that the roller 31 carried by this arm slides in the slot 32 of the movable plate 33 and at the same time shifts this plate and the valve disc 41 in the valve chamber of the housing 10 so that this mechanism is clear of the passage between the holes 11b and 12b. Projecting members 46 are provided to the bottom side of the movable plate 33 and the buttons 47 are positioned in suitable holes formed in the bottom of these projections 46 so that these buttons slidably engage the surface of the plate 12 during this movement. The buttons 47 may be made of plastic material such as Teflon, nylon or Delrin and they prevent the bottom surfaces of the projections 46 which may be made of aluminum from scraping on the surfaces of the plate 12. Similar buttons 48 are provided to the sides of the movable plate 33 to take the side thrust of the movable plate 33 and prevent the sides of this plate from rubbing on the side walls 15 and 16.

A sealing gasket 45 is provided to the bottom face of the valve disc 41 and this sealing gasket engages the sealing surface of the plate 12 around the passage 12b when the valve disc is brought into sealing engagement with this plate as shown in FIG. 3. A bumper member 49 is attached to the inside of the end wall 13 and bumper buttons 50 of plastic material such as nylon, Teflon or Delrin are positioned in suitable holes formed in the end of the valve disc 41 to take up the shock when the valve disc 41 is closed. This closing action is accomplished by swinging the arm 29 in counter clockwise direction from its open position to bring the movable plate 33 and valve disc 41 into position across the passage between the holes 11b and 12b.

As the movable plate 33 is moved to its extreme leftward excursion the rollers 35 engage the inner surface of the plate 11 and the shock absorbing buttons 50 of the valve disc 41 are brought into engagement with the bumper member 49. The movable plate 33 is moved left a short distance past dead center of the links 37 so that it is moved from the position shown in FIGURE 2 to that shown in FIGURE 3 with respect to the valve disc 41. When the plate 33 is moved from the position shown in FIGURE 2 to the position shown in FIGURE 3 the links 37 move the valve disc 41 with the sealing gasket thereof against the valve sealing surface because the bumpers 50 prevent further forward movement of the valve disc 41. Thus the links 37 provide solid connections between the plate 33 and valve disc 41 and the rollers 35 firmly engage the wall 11 to press the gasket of valve disc against the plate 12. Upward pressure against the disc 41 indicated by the arrow in FIGURE 3 is transmitted to the rollers 35 through links 37. Thus the valve disc 41 is locked in its sealing position with the sealing gasket 45 firmly pressed against the plate 12. In this position, the rollers 35 assume the full load of the pressure against the valve disc 41 and in valves in which the effective diameter of the valve disc 41 is on the order of 16 inches this pressure may be on the order of 5200 pounds.

This valve mechanism is provided with a cylinder and piston arrangement for rotating the arm 29 for opening and closing the valve. This mechanism is of the type disclosed in application Serial No. 50,499 filed August 18, 1960, now Patent No. 3,141,647, for Valve with Remote Control Actuator and therefore will be described only briefly in the present application. This actuator is made up of a cylinder 53 which is movable by air or liquid pressure on the shaft 54 that is mounted on the plate 11 by means of the members 52 which are attached to the plate 11 by suitable bolts. A rack 55 which is adapted to mesh with the sprocket 24 is fixedly attached to the side walls of the cylinder 53 and this rack is of a width corresponding to the distance between the washers 23 and 25 so that these washers prevent the rack 55 and cylinder 53 from rotating on the shaft 54. A piston 56 is fixedly attached to the shaft 54 and suitable passageways through the shaft 54 open on opposite sides of this piston so that air or liquid pressure may be supplied to or exhausted from the cylinder 53 on either side of this piston. Fluid pressure is thus supplied to the cylinder which is caused to shift its position on the shaft 54 thereby rotating the sprocket 24 shaft 20 and arm 29 when it is desired to actuate the valve mechanism into either closed or open positions.

While I have shown and described a preferred embodiment of the invention, it is apparent that the invention is capable of variation and modification from the form shown so that the scope thereof should be limited only by the proper scope and interpretation of the claims appended hereto.

What I claim is:

1. A gate valve adapted for sealing large high vacuum lines, comprising a casing having a pair of openings communicating with a passage therethrough that is adapted to be sealed, said casing also having a chamber communicating with said passage, said chamber extending in a direction transverse to said passage, and having a width greater than the diameter of said passage so that a shoulder is provided in said chamber on one side thereof around one opening to said passage and a sealing surface is provided in said chamber on the opposite side thereof around the other opening to said passage, a movable plate positioned in said chamber, said plate having a width greater than the diameter of the openings to said passage, a plurality of rollers, means for rotatably supporting said rollers on one side of said plate spaced around the circumference of said plate, said rollers engaging said shoulder when said plate is interposed across said passage, a valve disc, a plurality of links for pivotally connecting said valve disc to said plate, said valve disc having sealing means on the side thereof facing said sealing surface, said chamber having an end wall adjacent to said passage, bumper means on said end wall and on said valve disc, projections extending from the other side of said plate toward said opposite side of said chamber, resilient members attached to said projections for slidably engaging surfaces of said opposite side, means for moving said plate in said chamber, said rollers engaging surfaces of said one side of said chamber while said resilient members engage the surface of said opposite side so that said plate has support from both said sides of said chamber, said valve disc being swung on said links to bring said sealing means thereof firmly in contact with said sealing surface when said bumper means are pressed together and the pressure of said contact is transmitted through said links to said rollers.

2. A gate valve adapted for sealing large high vacuum lines, comprising a casing having a pair of openings communicating with a passage therethrough that is adapted to be sealed, said casing also having a chamber communicating with said passage, said chamber extending in a direction transverse to said passage and having a width greater than the diameter of said passage so that a shoulder is provided in said chamber on one side thereof around one opening to said passage and a sealing surface is provided in said chamber on the opposite side thereof around the other opening to said passage, a movable plate positioned in said chamber, said plate having a width greater than the diameter of the openings to said passage, a plurality of rollers, means for rotatably supporting said rollers on one side of said plate so that said rollers engage said shoulder when said plate is interposed across said passage, a valve disc, a plurality of links for pivotally connecting said valve disc to said plate, resilient means for normally holding said valve disc against the other side of said plate, said valve disc having sealing means on the side thereof facing said sealing surface, said chamber having an end wall adjacent to said passage, bumper means on said end wall and on said valve disc, projections extending from said other side of said plate toward said opposite side of said chamber, resilient members attached to said projections for slidably engaging surfaces of said opposite side, means for moving said plate in said chamber, said rollers engaging surfaces of said one side of said chamber while said resilient members engage the surface of said opposite side so that said plate has support from both said sides of said chamber, said valve disc being swung on said links to bring said sealing means thereof firmly in contact with said sealing surface when said bumper means are pressed together and the pressure of said contact is transmitted through said links to said rollers.

3. A gate valve adapted for sealing large high vacuum lines, comprising a casing having a pair of openings communicating with a passage therethrough that is adapted to be sealed, said casing also having a chamber communicating with said passage, said chamber extending in a direction transverse to said passage, and having a width greater than the diameter of said passage so that a shoulder is provided in said chamber on one side thereof around one opening to said passage and a sealing surface is provided in said chamber on the opposite side thereof around the other opening to said passage, a movable plate positioned in said chamber, said plate having a width greater than the diameter of the openings to said passage, a plurality of rollers, means for rotatably supporting said rollers on one side of said plate spaced around the circumference of said plate, said rollers engaging said shoulder when said plate is interposed across said passage, a valve disc, a plurality of links for pivotally connecting said valve disc to said plate, said links being connected between said roller supporting means and said valve disc, said valve disc having sealing means on the side thereof facing said sealing surface, said chamber having an end wall adjacent to said passage, bumper means on said end wall and on said valve disc, means extending from the other side of said plate toward said opposite side of said chamber for slidably engaging surfaces of said opposite side, means for moving said plate in said chamber, said rollers engaging surfaces of said one side of said chamber while said extending means engage the surface of said opposite side so that said plate has support from both said sides of said chamber, said valve disc being swung on said links to bring said sealing means thereof firmly in contact with said sealing surface when said bumper means are pressed together and the pressure of said contact is transmitted through said links to said rollers.

4. A gate valve adapted for sealing large high vacuum lines, comprising a casing having a pair of openings communicating with a passage therethrough that is adapted to be sealed, said casing also having a chamber communicating with said passage, said chamber extending in a direction transverse to said passage, and having a width greater than the diameter of said passage so that a shoulder is provided in said chamber on one side thereof around one opening to said passage and a sealing surface is provided in said chamber on the opposite side thereof around the other opening to said passage, a movable plate positioned in said chamber, said plate having a width greater than the diameter of the openings to said passage, a plurality of rollers, means for rotatably supporting said rollers on one side of said plate spaced around the circumference of said plate, said rollers engaging said shoulder when said plate is interposed across said passage, a valve disc, a plurality of links for pivotally connecting said valve disc to said plate, said valve disc having sealing means on the side thereof facing said sealing surface, said chamber having an end wall adjacent to said passage, bumper means on said end wall and on said valve disc, resilient means extending from the other side of said plate toward said opposite side of said chamber, for slidably engaging surfaces of said opposite side, means for moving said plate in said chamber, said rollers engaging surfaces of said one side of said chamber while said resilient means engage the surface of said opposite side so that said plate has support from both said sides of said chamber, said valve disc being swung on said links to bring said sealing means thereof firmly in contact with said sealing surface when said bumper means are pressed together and the pressure of said contact is transmitted through said links to said rollers.

References Cited by the Examiner
UNITED STATES PATENTS

| | | | |
|---|---|---|---|
| 832,844 | 10/06 | Collar | 251—158 |
| 1,707,125 | 3/29 | Loffler | 251—193 |
| 1,970,964 | 8/34 | Hosmer | 251—158 |
| 2,203,399 | 6/40 | Wheatley | 251—158 |
| 2,850,260 | 9/58 | Perazone et al. | 251—203 XR |
| 3,003,742 | 10/61 | Kearns | 251—204 XR |
| 3,033,516 | 5/62 | Williams | 251—204 XR |
| 3,112,095 | 11/63 | Batzer | 251—204 XR |

FOREIGN PATENTS

| | | |
|---|---|---|
| 929,920 | 7/55 | Germany. |
| 136,990 | 3/61 | Russia. |

LAVERNE D. GEIGER, *Primary Examiner.*

ISADORE WEIL, *Examiner.*